(12) United States Patent
Knodel et al.

(10) Patent No.: US 12,121,033 B2
(45) Date of Patent: Oct. 22, 2024

(54) CUTTING MACHINE AND CONVEYOR DEVICE

(71) Applicant: VEMAG Maschinenbau GmbH, Verden/Aller (DE)

(72) Inventors: Peter Knodel, Oyten (DE); Peter Hoffmann, Achim (DE)

(73) Assignee: VEMAG Maschinenbau GmbH, Verden (DE)

( * ) Notice: Subject to any disclaimer, the term of this patent is extended or adjusted under 35 U.S.C. 154(b) by 322 days.

(21) Appl. No.: 17/864,210

(22) Filed: Jul. 13, 2022

(65) Prior Publication Data
US 2023/0018994 A1 Jan. 19, 2023

(30) Foreign Application Priority Data
Jul. 14, 2021 (DE) .......................... 102021118255.7

(51) Int. Cl.
*A22C 11/00* (2006.01)
*A22C 11/02* (2006.01)
(52) U.S. Cl.
CPC .......... *A22C 11/008* (2013.01); *A22C 11/006* (2013.01); *A22C 11/02* (2013.01)
(58) Field of Classification Search
CPC .............................. A22C 11/008; A22C 11/02
USPC ............................................. 452/32, 35, 37
See application file for complete search history.

(56) References Cited

U.S. PATENT DOCUMENTS

| | | | |
|---|---|---|---|
| 3,026,561 A | 3/1962 | Cline | |
| 4,584,740 A | 4/1986 | Townsend | |
| 7,775,861 B2 * | 8/2010 | Sames | A22C 11/02 452/32 |
| 8,353,742 B1 * | 1/2013 | Choi | A21C 9/063 452/32 |
| 9,554,581 B2 * | 1/2017 | Willburger | B65G 47/082 |
| 2008/0070489 A1 | 3/2008 | Bachtle | |

FOREIGN PATENT DOCUMENTS

DE 202012004523 U1 6/2012

OTHER PUBLICATIONS

European Patent Office, Extended Search Report issued in EP 22184716.3-1105, dated Nov. 23, 2022 and English Translation (17 pages).

* cited by examiner

*Primary Examiner* — Richard T Price, Jr.
(74) *Attorney, Agent, or Firm* — Wood Herron & Evans LLP

(57) ABSTRACT

A cutting machine includes a cutting device and a co-operating conveyor device for conveying food products in a conveying direction. The conveyor device includes at least one conveyor unit having a conveyor belt which is guided by at least one deflection roll and which comes into contact with the food products in the contact area and having at least one guide means for guiding the conveyor belt. The at least one guide means has a first support portion for supporting the conveyor belt at a first height and a second support portion for supporting it at a second height, these heights being spaced apart in a direction extending perpendicularly to the conveying direction, and at least one recess arranged between the first height and the second height, in which the conveyor belt can give way at least partly due to contact with a food product.

16 Claims, 9 Drawing Sheets

CUTTING MACHINE AND CONVEYOR DEVICE

CROSS-REFERENCE TO RELATED APPLICATION

This application claims priority to German Application No. 10 2021 118 255.7, filed Jul. 14, 2021. The above-mentioned patent application is incorporated herein by reference in its entirety.

TECHNICAL FIELD

This application relates to a cutting machine for separating food products, in particular sausage chains, including a cutting device for separating the food products and a conveyor device co-operating with the cutting device, for conveying the food products in a conveying direction. This application also relates to a conveyor device for such a cutting machine and to a food processing machine having such a cutting machine.

BACKGROUND

Cutting machines of the kind initially specified are generally known from the prior art. They are used in conjunction with a stuffing machine and a portioning device, for example, to produce and separate sausage chains. A pasty food mass, which may include sausage meat or a vegetarian alternative, is stuffed into a casing by the stuffing machine and portioned by the portioning device. The casings can preferably be a natural or synthetic gut casing, or a collagen gut casing. The portioned food products, such as sausage chains, are then fed to the respective cutting machine.

Cutting machines of the kind initially specified are also used to produce small batches by a stuffing table, and the food products are simply fed manually into the conveyor device of the cutting machine.

Cutting machines have a cutting device for separating the food products by cutting them at a predefined position. Cutting is preferably done by at least one cutting blade. For example, sausage chains can be cut at the respective twist points and thus separated. To convey the food products to and away from the cutting device, the cutting machines also have one or more conveyor devices each comprising one or more conveyor units. In most cases, the conveyor units have a conveyor belt, at least one deflection roll for guiding and deflecting the conveyor belt, and a guide means for guiding the conveyor belt. The guide means mostly have a planar support surface for supporting the conveyor belt, so that the latter comes into contact with the food product in the contact area. The food product is thus guided and conveyed in such a way that the food product can be cut at a predefined position.

Due to production-related variations in the outer dimensions, the surface of the food product may be exposed to increased pressure. The variable outer dimensions can be the cross-section, for example, or the diameter of the food product, which is referred to as the caliber in the case of sausages. Curvature of the food product occurs routinely in the case of food products with a natural gut casing, in particular, with the result that greater pressure is exerted locally on the food product by the conveyor belt that extends in the contact area in the conveying direction T. This pressure and the resultant friction between the conveyor belt and the guide means reduces the conveying speed and can cause damage to the food product.

As a result, it would be desirable to improve the conveying of food products having varying dimensions and/or curvatures, in a cutting machine or in a conveyor device for same, and in a food processing machine having such a cutting machine, such that the rejection of damaged food is reduced on the whole, at least, or the conveying speed is unaffected, at least.

SUMMARY

These and other technical objects and problems are addressed by the embodiments provided in this invention. To this end, the cutting machine according to embodiments of this invention includes the at least one guide means having a first support portion for supporting the conveyor belt at a first height $h_1$ and a second support portion for supporting the conveyor belt at a second height $h_2$, wherein height $h_1$ and $h_2$ are spaced apart in a direction h extending perpendicularly to the conveying direction T, and by the conveyor unit also having at least one recess arranged between the first height $h_1$ and the second height $h_2$, into which the conveyor belt can at least partly give way due to contact with a food product.

Due to the recess between the first height $h_1$ and the second height $h_2$, a region is provided in which the conveyor belt can give way at least partly due to contact with a food product. This is the case, for example, when food products with a curvature or with too large a caliber or with too large a diameter are conveyed by the conveyor device. The tension of the conveyor belt is preferably to be so selected that it is deformed in such a way, due to contact with a food product, that it can at least partly give way into the recess without damaging the food product. The distance between height $h_1$ and height $h_2$ preferably corresponds to the diameter or height in direction h of the food to be conveyed, so that it is supported along its entire height by the conveyor belt and the guide means.

Within the meaning of the invention, at least one guide means for guiding the conveyor belt in the contact area is needed. A plurality of guide means for guiding the conveyor belt, which preferably guide the conveyor belt in sections in the contact area, may preferably also be provided. The first support portion and the second support portion may also be formed integrally on a guide means, and also on two separate guide members of a two-part guide means.

Direction h is preferably the vertical direction, and the conveying direction T extends preferably in the horizontal direction.

In the region of the first support section and/or the second support section, the conveyor belt can have punctiform contact with the support portion and/or line contact and/or surface contact along a predefined length of the support section in the conveying direction T. The first height $h_1$ and the second height $h_2$ are to be understood, accordingly, either as a discrete value with support being provided by punctiform contact or line contact, or as a range of values that includes the respective height $h_1$ and $h_2$. In the case of surface contact, a first range of value that includes height $h_1$ is spaced apart in direction h from a second range of values that includes height $h_2$. The conveyor belt is held at two positions by the first support portion and the second support portion, namely at $h_1$ and at height $h_2$, or at the ranges which include the respective height, and is thus held sufficiently to convey the food products in the conveying direction T.

The conveyor belt is preferably coupled to a drive means which is assigned to the conveyor device.

According to a preferred embodiment of the invention, at least one guide means has the recess which is arranged between the first support portion and the second support portion of the guide means, such that the conveyor belt can give way at least partly into the recess due to contact with due to contact with a food product. The guide means can thus be manufactured in a simple manner and also comprises the recess, in addition to the first support portion and the second support portion. In a plane extending perpendicularly to the transport direction, the guide means thus has a recess on its side facing the conveyor belt and, in particular, is concave in shape. The recess can preferably have a shape matching that of the food product. In cases in which sausages are conveyed, the recess can be defined, for example, by an arc extending between the first support portion and the second support portion and which is concavely curved. In further variants, recesses with a polygonal shape, for example, may also be provided.

According to another preferred embodiment, the at least one guide means has a first guide member having the first support portion and a second guide member having the second support portion. The recess is preferably arranged between the first guide member and the second guide member. A two-part guide means is thus provided which guides the conveyor belt in the region of the first support section and the second support section. The recess can preferably be provided at least partially by a cavity, or by a housing region that is not used otherwise, between the first guide member and the second guide member.

According to a preferred embodiment of the invention, the first guide member and/or the second guide member may each be designed as a guide plate which extends at least in sections in the conveying direction T and which is adapted to support the conveyor belt. A combination of different guide members, for example guide rolls and guide plates, may be provided. Manufacturing the guide means can be simplified, on the whole, by a two-part guide means, and standard components such as rolls or plates can be used.

It is preferable that the conveyor unit is a first conveyor unit and that the conveyor device has a second conveyor unit arranged in the contact area parallel to and spaced apart from the first conveyor unit. The food products can thus be supported evenly on two sides and conveyed by the respective conveyor belt. The first conveyor unit and the second conveyor unit are preferably designed and arranged in mirror symmetry about the plane formed by conveying direction T and direction h.

According to an alternative preferred embodiment, the conveyor device has a receiving means which co-operates with the conveyor unit and which is arranged in the contact area parallel to and spaced apart from the conveyor unit. The food product to be conveyed is thus held between the conveyor unit and the co-operating receiving means and is moved along the receiving means in the conveying direction T by the motion of the conveyor belt. This simplifies the design of the cutting machine and reduces both the production costs and the maintenance costs.

At least one guide means is preferably designed as a guide roll which is mounted rotatably about a rotational axis extending in direction h. Direction h preferably extends in the vertical direction, so that the guide roll is rotatably mounted about a vertical axis. This reduces the resistance when guiding the conveyor belt, since there is only rolling friction between the guide roll and the conveyor belt. If the drive power is constant, the conveying speed therefore remains constant and is not adversely affected when conveying food products that have too large a diameter, for example. It is further preferred that a two-part guide means may be designed with a first guide member and a second guide member as a pair of concentric guide rolls having matching diameters.

Such a guide roll may be adapted, within the meaning of the invention, to guide and to deflect the conveyor belt. In this case, the guide roll simultaneously performs the function of a deflection roll.

It is further preferred that the guide roll and/or the deflection roll have a diameter which varies in direction h and which obtains a maximum $d_{Max}$ at the first support portion and/or at the second support portion. This means that the region of the first and/or second support section protrudes relative to the rest of the guide roll and/or deflection roll in such a way that a recess is formed therebetween, into which the conveyor belt can give way. In particular, the respective guide roll and/or deflection roll may have a maximum diameter $d_{Max}$ in the region of the first support section and in the region of the second support section. Alternatively, a first guide roll with a maximum diameter $d_{Max}$ can also be provided in the region of the first support section and a second guide roll with a maximum diameter $d_{Max}$ can be provided in the region of the second support section, for example. The deflection roll, too, can accordingly be a first deflection roll with a maximum diameter $d_{Max}$ in the region of the first support section, and a second deflection roll with a maximum diameter $d_{Max}$ can be provided in the region of the second support section. This means that the deflection rolls, too, may have a first support portion and/or a second support portion. The conveyor belt can therefore give way into a recess, also in the region of the respective deflection roll, due to contact with a food product.

It is particularly preferable that the guide roll and/or the deflection roll be designed as concave rolls. The smooth transitions of a concave roll prevent peak stresses and increased friction on the conveyor belt.

According to another preferred embodiment, at least one guide means is designed as a guide plate having a first longitudinal edge extending in the conveying direction and a second longitudinal edge extending parallel to and spaced apart from the first longitudinal edge, and wherein the first support portion is formed by the first longitudinal edge and/or the second support portion is formed by the second longitudinal edge. Such a guide plate preferably extends in the conveying direction T in the contact area.

A first guide means is preferably designed as a guide plate and a second guide means as one or more guide rolls, which are arranged upstream and/or downstream in the conveying direction T from the guide plate. A guide plate provides even support in the region of the first support section and/or second support section in the conveying direction T, the guide rolls simultaneously reducing the friction and increasing the conveying speed. It is further preferred that the support portion of the guide rolls and/or of the deflection rolls protrudes slightly, relative to the guide plate, in the direction of the conveyor belt, so that when the conveyor belt is in the unloaded state it only comes into contact with the first support region and second support region of the guide rolls and only rolling friction occurs, so that wear and tear is reduced. If the conveyor belt comes into contact with a food product to be conveyed, it can give way into the respective recess of the guide rolls and/or of the guide plate, the conveyor belt being evenly supported by the guide plate along a predefined section in the conveying direction T.

According to another preferred embodiment, the respective guide plate is designed in two parts, such that a first part of the guide plate has the first support portion and a second part of the guide plate has the second support portion, wherein the first part of the guide plate and the second part of the guide plate are arranged spaced apart from each other such that the recess is formed between the first part of the guide plate and the second part of the guide plate. The two-part guide plate is preferably arranged between two adjacent guide rolls and/or two adjacent deflection rolls.

The conveyor belt preferably has a height $h_T$, and the at least one guide means preferably has a height $h_F$ in direction h that is greater than the height $h_T$ of the conveyor belt. The conveyor belt is thus guided and supported reliably even when there is a deviation in its position in direction h. The respective guide roll and/or deflection roll preferably has a first end section having a stop member for fixing the conveyor belt in direction h, and a second, matching designed end section having a second stop member. The conveyor belt is thus held securely in place in direction h.

It is further preferred that at least one guide means includes a metal material, in particular steel. The guide means thus has sufficient strength to guide and reliably support the conveyor belt.

It is further preferred that the conveyor belt includes an elastomer. This makes the conveyor belt wear-resistant and sufficiently elastic to be able to give way into the recess by elastic deformation due to contact with a food product, without damaging the food product.

The invention has been described above with regard to a first embodiment. According to a second embodiment, the invention relates to a conveyor device for a cutting machine, in particular for a cutting machine according to the first embodiment of the invention, comprising a conveyor belt extending in a conveying direction T at least in sections in a contact area and designed to come into contact with the food products in the contact area, at least one deflection roll for guiding the conveyor belt, and at least one guide means for guiding the conveyor belt in the contact area. With regard to a conveyor device, the invention achieves the object initially specified by the at least one guide means having a first support portion for supporting the conveyor belt at a first height $h_1$ and a second support portion for supporting the conveyor belt at a second height $h_2$, wherein height $h_1$ and $h_2$ are spaced apart in a direction h extending perpendicularly to the conveying direction T, and by the conveyor unit also having at least one recess arranged between the first height $h_1$ and the second height $h_2$, into which the conveyor belt can at least partly give way due to contact with a food product. The conveyor device according to the invention utilizes the advantages described above in relation to a cutting machine having such a conveyor device. Preferred embodiments and aspects of the first embodiment of the invention are at the same time preferred embodiments and aspects of the second embodiment of the invention.

According to a third embodiment, the invention relates to a food processing machine for producing a food product, comprising a stuffing machine for receiving a pasty food mass and for stuffing the pasty food mass into a casing, a portioning device for portioning the food in the casing, and a cutting machine according to the first embodiment of the invention for separating the portioned food products. The food processing machine according to the third embodiment of the invention, comprising a cutting machine according to the invention, utilizes the advantages described above in relation to the first embodiment of the invention. Preferred embodiments and aspects of the first embodiment of the invention are at the same time preferred embodiments and aspects of the third embodiment of the invention.

BRIEF DESCRIPTION OF THE DRAWINGS

Further advantages, features and possible applications of the present invention will be apparent from the following detailed description in connection with the drawings. The accompanying drawings, which are incorporated in and constitute a part of this specification, illustrate one of more embodiments of the invention and, together with the general description given above and the detailed description given below, explain the one or more embodiments of the invention.

DETAILED DESCRIPTION

Figure 1A:
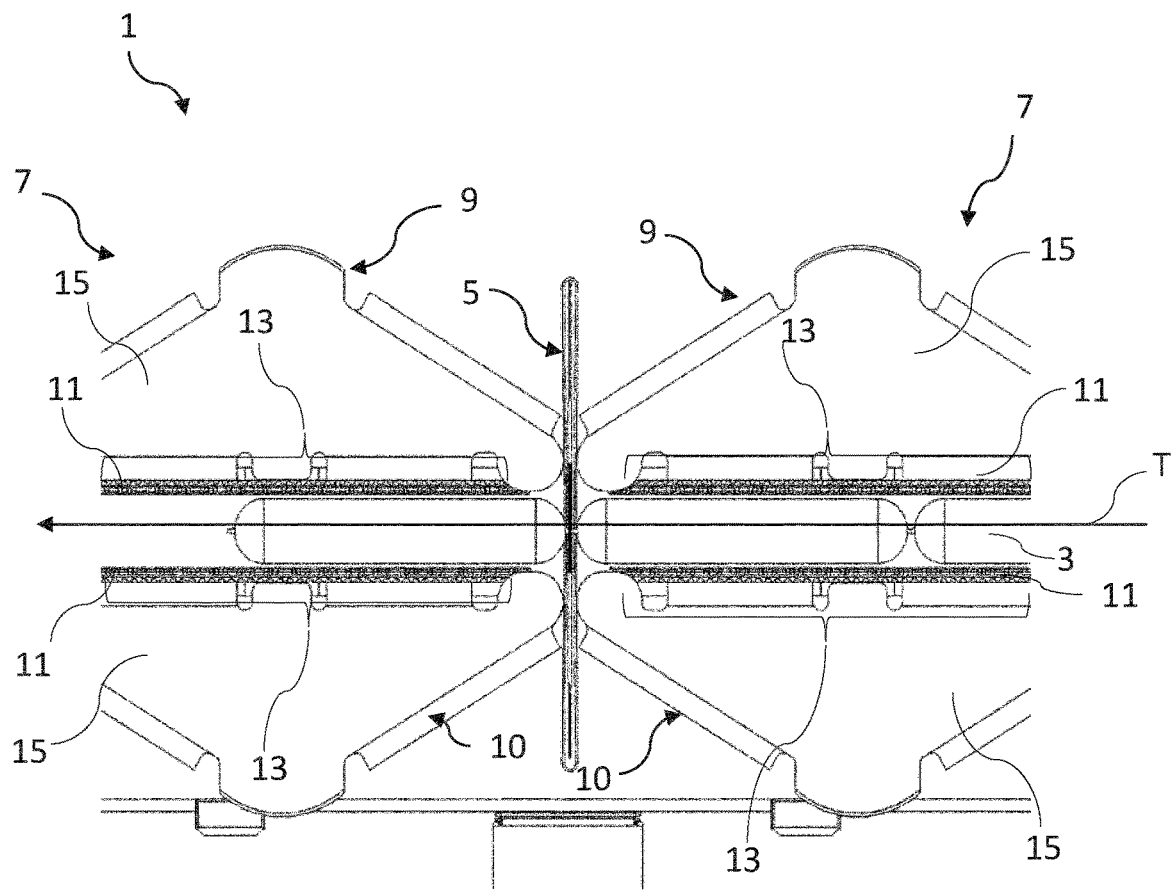
FIG. 1A shows a detail of a prior art cutting machine, with food products of too small dimensions.

FIGS. 1A, 1B, 2A and 2B show a prior art cutting machine 1 and a prior art conveyor device 7 for such a cutting machine. In the embodiment shown, food product 3 is a sausage or chain of sausages with a diameter referred to as the caliber.

Such cutting machines 1 also have at least one conveyor device 7 upstream from cutting device 5 for conveying food product 3 in a conveying direction T. Such cutting machines 1 preferably also have a second conveyor device 7 downstream from cutting device 5 which is designed to convey the food products 3 separated by cutting device 5 in conveying direction T for further processing.

Figure 1B:
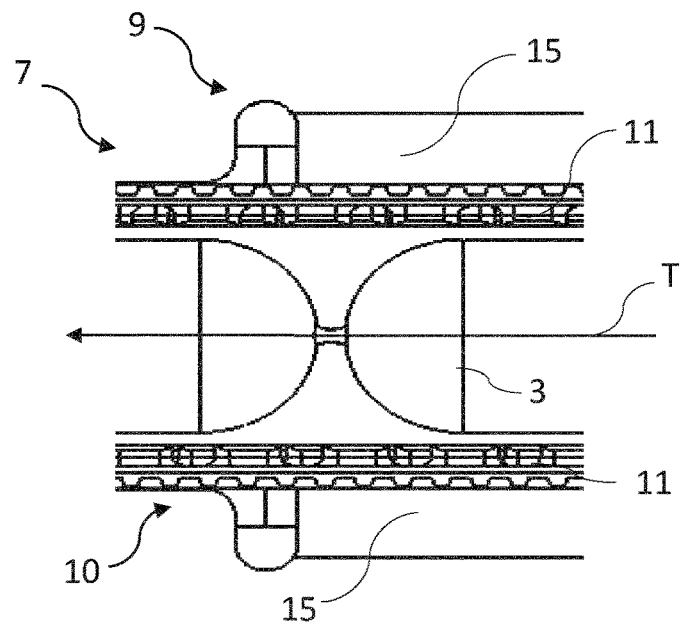
FIG. 1B shows a detail of a prior art conveyor device, with food products of too small dimensions.

Conveyor device 7, a detail of which is shown in FIG. 1B, has two conveyor units 9, 10, each having a conveyor belt 11 which comes into contact with the food product in a contact area 13. The two conveyor units 9, 10 run parallel to and spaced apart from each other in contact area 13. Conveyor units 9, 10 each have a guide means 15 for guiding conveyor belt 11 in contact area 13 and which is designed to guide conveyor belt 11 in such a way that it extends at least in sections in conveying direction T in contact area 13.

Figure 2A:
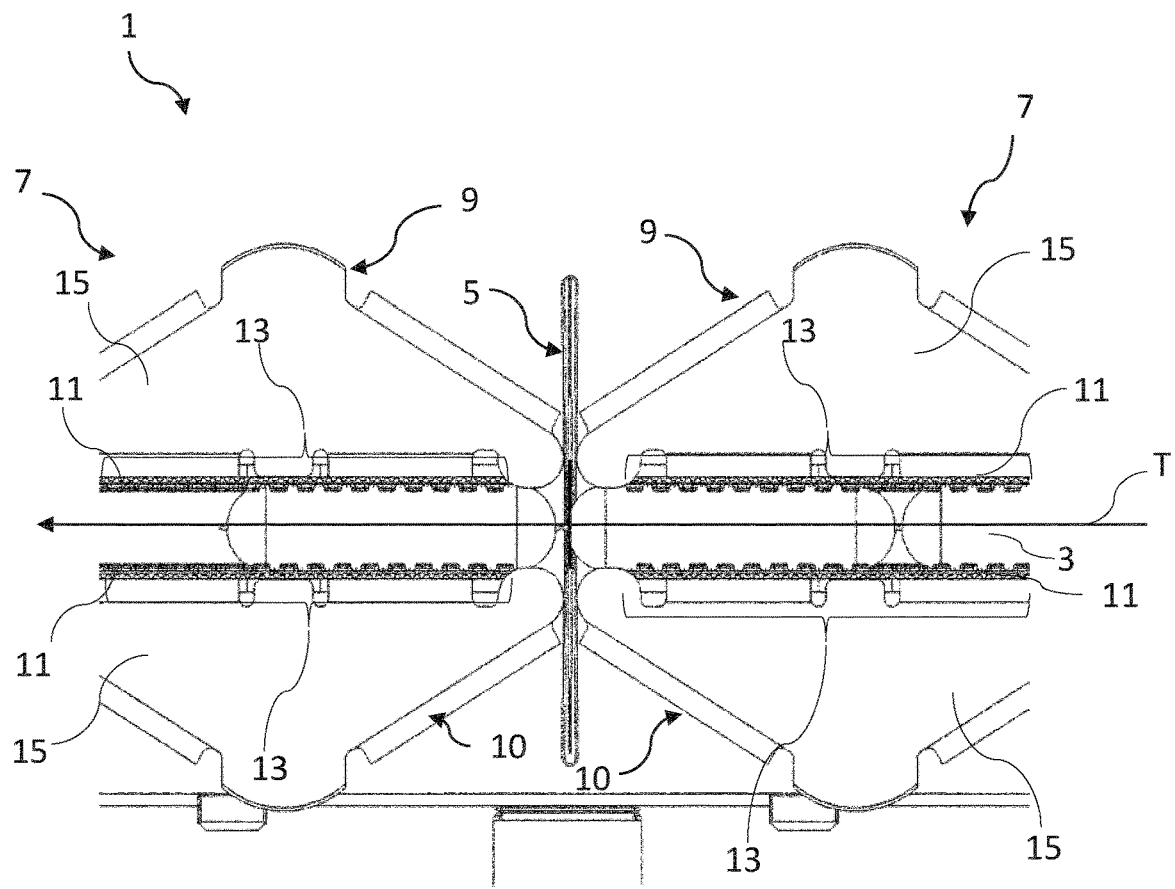
FIG. 2A shows the cutting machine of FIG. 1A, with food products of too large dimensions.
Figure 2B:
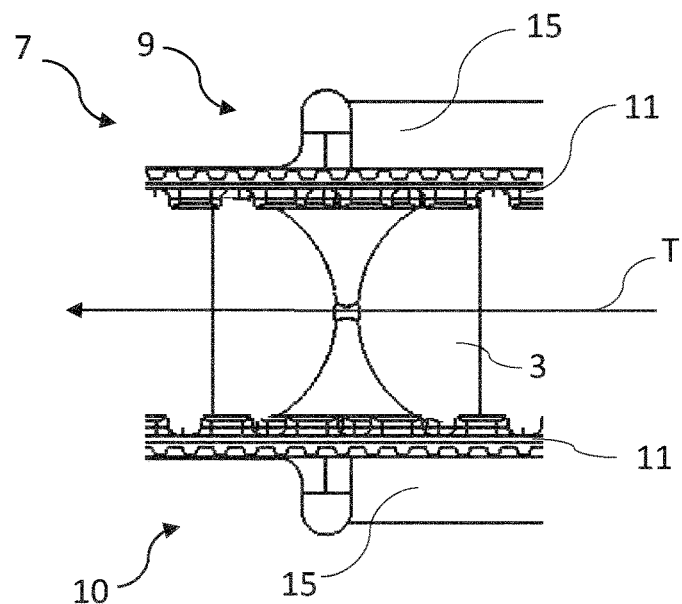
FIG. 2B shows the conveyor device of FIG. 1B, with food products of too large dimensions.

The cutting machine 1 shown in FIG. 2A is the same as the cutting machine shown in FIG. 1A and the conveyor device shown in in FIG. 2B is the same as the conveyor device shown in FIG. 1B. FIGS. 1A, 1B and 2A, 2B differ only by the dimensions of food product 3, in particular by the size of the caliber, i.e., the diameter of food product 3.

In FIGS. 1A and 1B, food product 3 has a caliber which is smaller than the distance between the two conveyor belts 11 of conveyor units 9, 10 arranged parallel to and spaced apart from each other. This distance can preferably be adjusted, but production-related variation in caliber may occur. When food products 3 with too small a caliber, as shown in FIGS. 1A and 1B, are conveyed, they do not come sufficiently into contact with conveyor belt 11 in contact area 13 and thus cannot be positioned exactly in cutting device 5, for example.

In FIGS. 2A and 2B, food product 3 has a diameter which is greater than the distance between the two conveyor belts 11 of conveyor units 9, 10 arranged parallel to and spaced apart from each other. In this case, greater pressure is exerted on food product 3 by conveyor belt 11 and guide means 15, as a result of which it may be damaged. The friction exerted on conveyor belt 11 at guide means 15 is also increased by the food product 3, thus reducing the conveying speed in conveying direction T.

Figure 3:
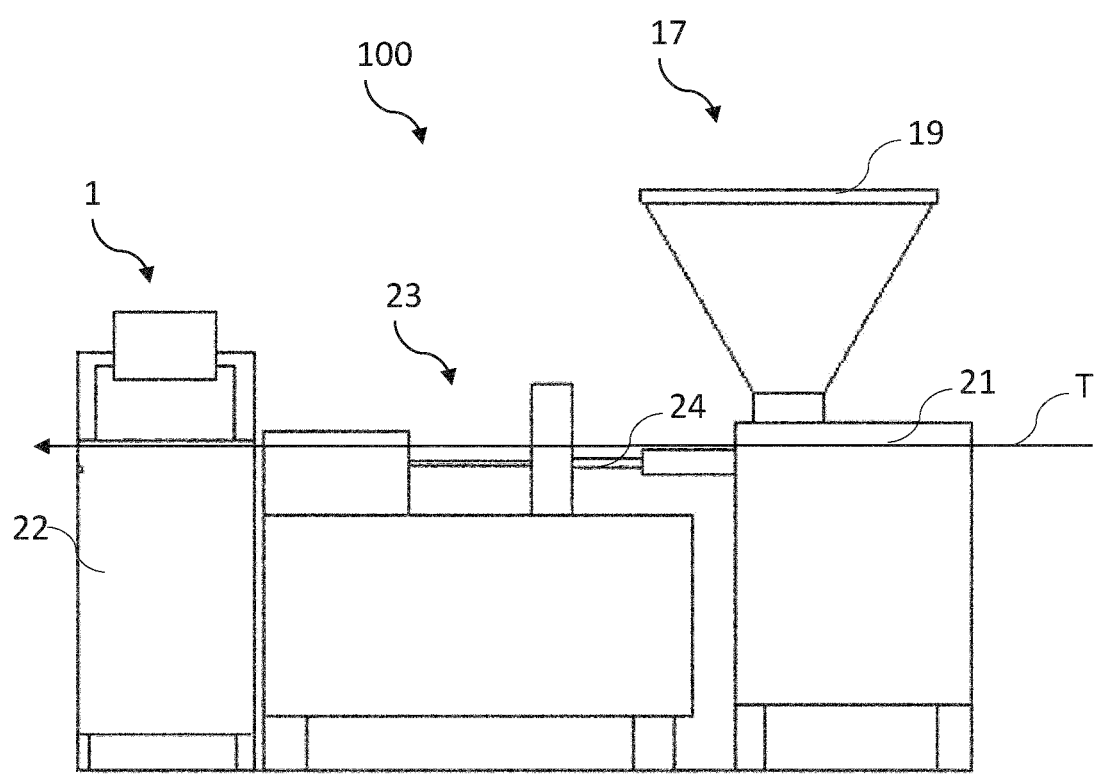
FIG. 3 shows a food processing machine according to embodiments of this invention.

FIG. 3 shows a food processing machine 100 according to the invention, comprising a cutting machine 1, a stuffing machine 17 and a portioning device 23 arranged between stuffing machine 17 and cutting machine 1. Portioning machine 23 and cutting machine 1 are arranged downstream from stuffing machine 17.

Stuffing machine 17 has a feed hopper 19 and a housing 21. Cutting machine 1 likewise has a housing 22 which is designed at least partly to accommodate cutting device 5 and on which conveyor device 7 is arranged at least in sections (cf. FIG. 6).

A pasty food product can preferably be stuffed by stuffing machine 17 via a stuffing tube 24 into a casing and subsequently portioned by portioning device 23. The casing can preferably be a natural or synthetic gut casing, and the pasty food product that can be introduced into stuffing machine 17 can be sausage meat or a vegan or vegetarian alternative. In this case, the finished food product 3 is sausages, and portioning device 23 includes a twist line for twisting the sausage casing. The sausage chains thus produced are then separated into separate sausages by cutting machine 1.

FIGS. 4A, 4B, 5A and 5B show embodiments of conveyor device 7 in schematic form.

Figure 4A:
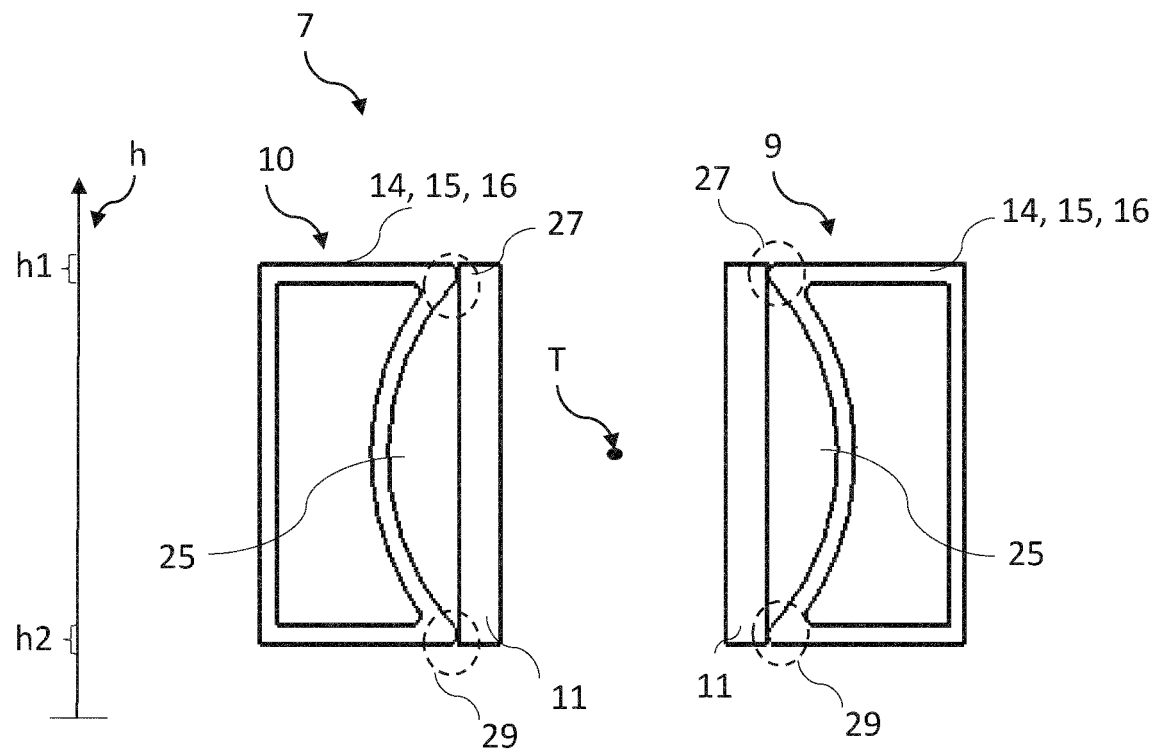
FIG. 4A shows a cross-sectional view of a first embodiment of the conveyor device according to the invention, in an unloaded state.
Figure 4B:
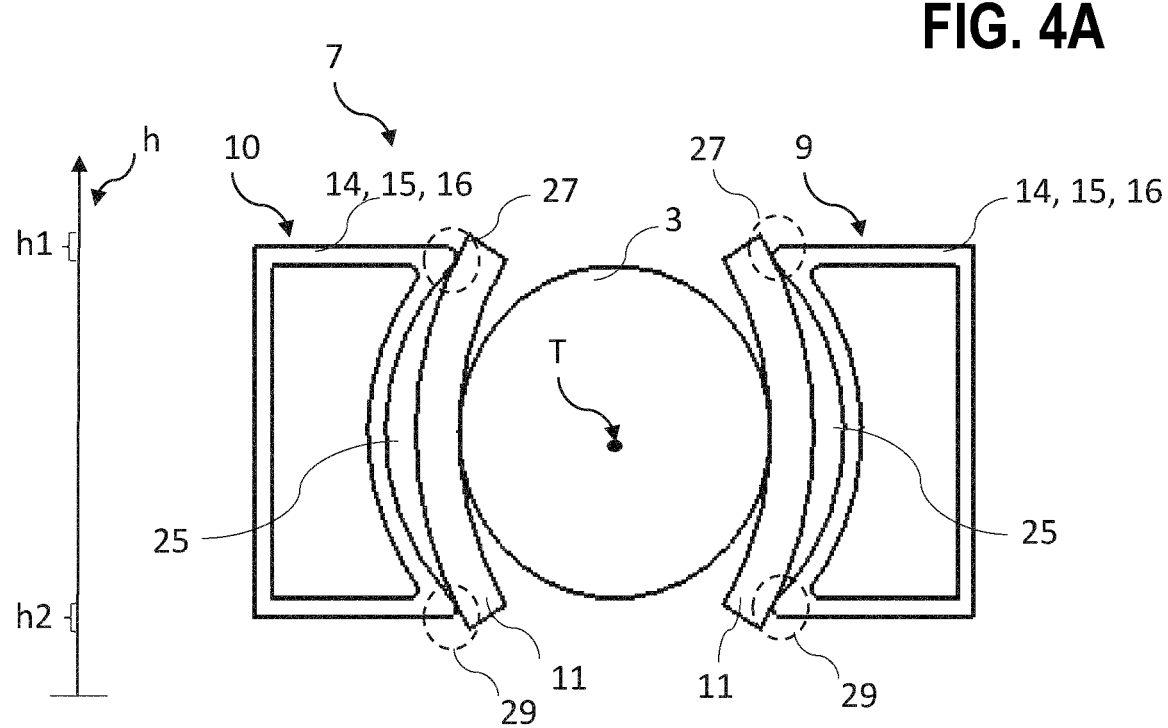
FIG. 4B shows the conveyor device of FIG. 4A, with a food product conveyed therein.

FIG. 4A shows a first embodiment of conveyor device 7 according to the invention in an unloaded state, and FIG. 4B correspondingly shows conveyor device 7 in a loaded stated in which food product 3 comes into contact with conveyor device 7. Conveyor device 7 is shown in a side view, in which the cutting plane extends orthogonally to conveying direction T.

Conveyor device 7 comprises two conveyor units 9, 10 arranged parallel to and spaced apart from each other. Conveyor units 9, 10 each have a conveyor belt 11 which preferably includes an elastomer, and a guide means 14, 15, 16 for guiding conveyor belt 11 in contact area 13 (cf. FIG. 6).

In the cutting plane shown, which extends orthogonally to conveying direction T, conveyor belt 11 has a preferred thickness of less than 5 mm and a height which is adapted to the height of food product 3 and to the height of guide means 14, 15, 16. Guide means 14, 15, 16 each have a recess 25 into which conveyor belt 11 can give way when in contact with food product 3. Recess 25 is arranged between a first support portion 27 and a second support portion 29 of guide means 14, 15, 16.

The first support portion 27 is configured to support conveyor belt 11 at a first height $h_1$, and the second support portion 29 is configured to support conveyor belt 11 at a second height $h_2$. Height $h_1$ and height $h_2$ are arranged at a distance from each other in a direction h. Heights $h_1$ and $h_2$ are to be understood within the meaning of the invention not only as discrete values but also as value ranges in which conveyor belt 11 is supported by the respective support portion 27, 29. For example, height $h_1$ may comprise a range from 1 to 20 mm in which conveyor belt 11 is supported by the upper support portion 27. The same also applies to height $h_2$.

As shown in FIG. 4B in particular, conveyor belt 11 can give way into the respective recess 25 of conveyor unit 9, 10 due to contact with a food product 3 which is conveyed in conveying direction T by conveyor device 7. In the embodiment shown, guide means 14, 15, 16 is integral in design and concave in shape in relation to the cutting plane shown, so recess 25 is integrally formed on guide means 14, 15, 16 between the first support portion 27 and the second support portion 29 due to the concave shape.

In the embodiment shown in FIGS. 4A and 4B, the guide means may have any shape which is suitable to guide the conveyor belt at height $h_1$ and at height $h_2$ and for it to simultaneously have a recess 25. The guide means is preferably designed as a guide plate 15 (cf. FIGS. 7A, 7B, 9) or as a guide roll 14, 16 (cf. FIGS. 8A, 8B, 9).

Figure 5A:
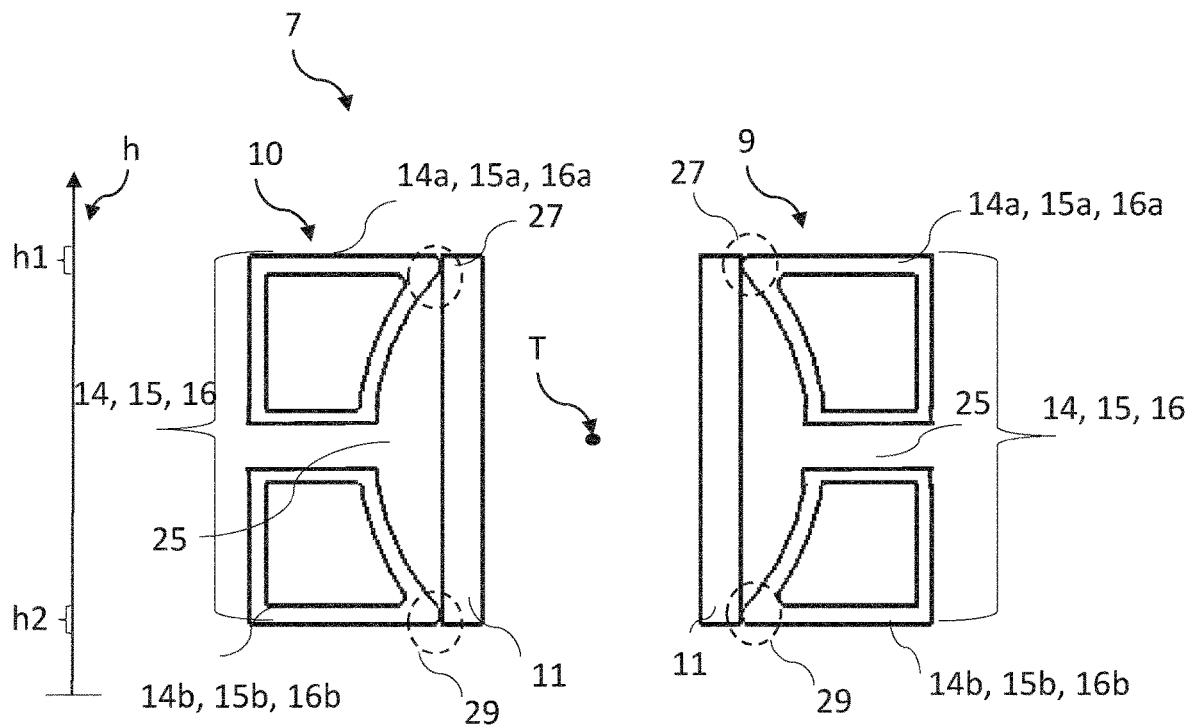
FIG. 5A shows a cross-sectional view of a second embodiment of the conveyor device according to the invention, in an unloaded state.
Figure 5B:
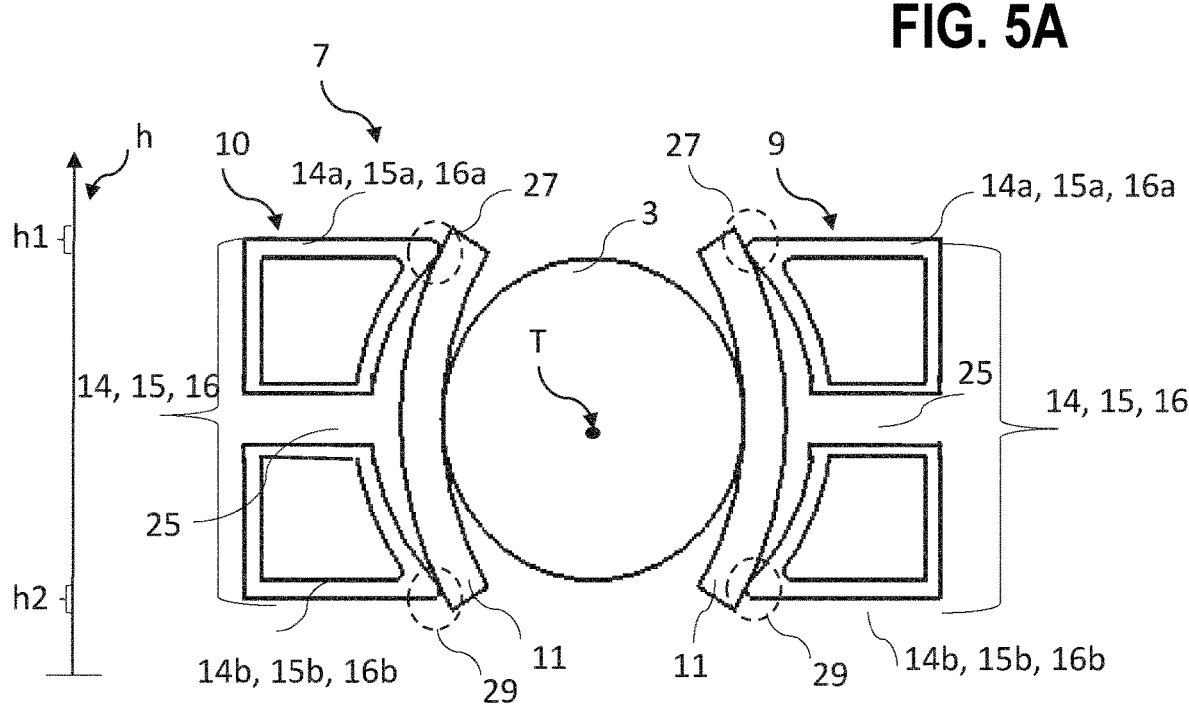
FIG. 5B shows the conveyor device of FIG. 5A, with a food product transported therein.

The embodiment shown in FIGS. 5A and 5B differs from the embodiment shown in FIGS. 4A and 4B in that guide means 14, 15, 16 is designed in two parts, with a first guide member 14a, 15a, 16a and a second guide member 14b, 15b, 16b. The first guide member 14a, 15a, 16a has the first support portion 27 for supporting conveyor belt 11 at the first height $h_1$, and the second guide member 14b, 15b, 16b has the second support portion 29 for supporting conveyor belt 11 at the first height $h_2$. In this embodiment, recess 25 is formed at least in sections between the first guide member 14a, 15a 16a and the second guide member 15b, 14b, 15b, 16b, such that conveyor belt 11 can also give way at least partially, due to contact with the food product 3 to be conveyed, into the recess between the first guide member 14a, 15a, 16a and the second guide member 15b, 14b, 15b, 16b.

In the embodiment shown in FIGS. 5A and 5B, the guide means or the guide members may have any shape which is suitable for guiding the conveyor belt at height $h_1$ and at height $h_2$ and for it to simultaneously have a recess 25. The guide means is preferably designed as a guide plate 15 (cf. FIGS. 7A, 7B, 9) or as a guide roll 14, 16 (cf. FIGS. 8A, 8B, 9).

Figure 6:
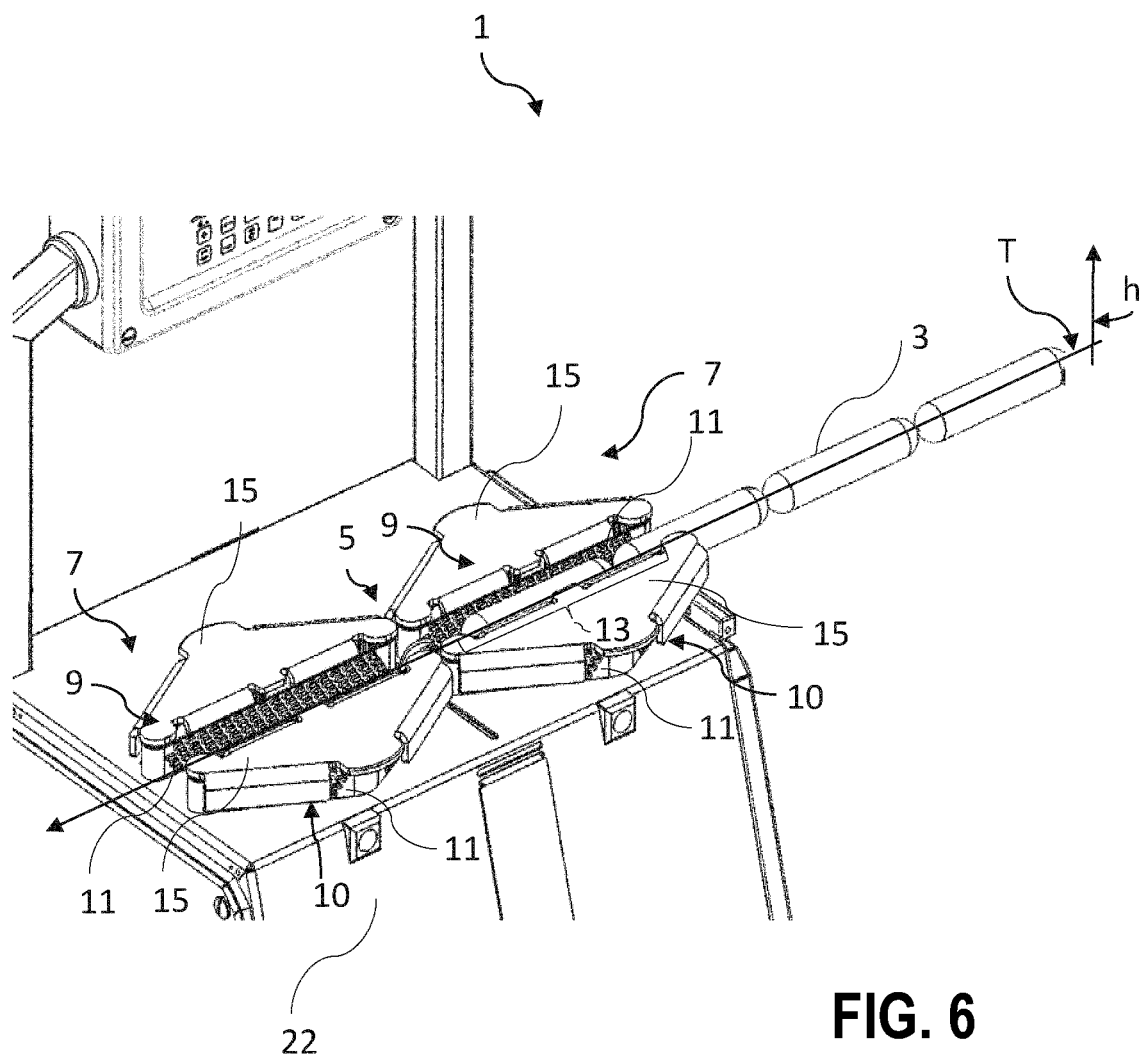
FIG. 6 shows a perspective view of a cutting machine according to the first embodiment of the invention.

FIG. 6 shows a first preferred embodiment of cutting machine 1 according to the invention. Cutting machine 1 is designed to convey food products 3, preferably sausages, in a conveying direction T.

Cutting machine 1 comprises a cutting device 5, a first conveyor device 7 upstream from the cutting device and a second conveyor device 7 downstream from cutting device 5. The conveyor device 7 upstream from cutting device 5 and the conveyor device 7 downstream from cutting device 5 are preferably of identical design.

According to the embodiment shown, each conveyor device 7 has two conveyor units 9, 10 which preferably have identical parts and are designed in mirror symmetry with each other. The first conveyor unit 9 and the second conveyor unit 10 are arranged parallel to and spaced apart from each other in contact area 13, such that they are symmetrical with reference to a mirror plane formed by conveying direction T and a vertical direction h. Food products 3 are received between the first conveyor unit 9 and the second conveyor unit 10 for conveying in conveying direction T.

Each conveyor unit 9, 10 has a conveyor belt 11 which extends at least in sections in conveying direction in contact area 13, and a guide means 15 for guiding conveyor belt 11. The conveyor device 7 downstream from cutting device 5 is preferably identical in design to conveyor device 7 upstream from cutting device 5. The two conveyor devices 7 are preferably arranged, at least in sections, on a housing 22 of cutting machine 1.

Conveyor units 9, 10 each also have at least one deflection roll 31 for guiding and deflecting conveyor belt 11. Deflection rolls 31 are rotatable about a rotational axis extending in direction h. Guide means 15 has a carrier plate 33 with a number of through holes 35 adapted to receive connecting elements 38 for connecting deflection rolls 31 with carrier plate 33. Deflection rolls 31 each have a first stop member 39 and a second stop member 40 spaced apart in direction h, wherein conveyor belt 11 (cf. FIG. 7B) is guided between the first stop member 39 and the second stop member 40 along deflection roll 31, wherein stop members 39, 40 prevent relative movement of conveyor belt 11 in direction h.

In contact area 13 (cf. FIG. 6), guide means 15 has a first longitudinal edge 41 which extends in conveying direction T and which forms the first support portion 27. Guide means 15 also has a second longitudinal edge 43 extending in conveying direction T, which provides support to the second support portion 29. Guide means 15 is embodied between the first support portion and the second support portion with a concave shape in relation to conveyor belt 11, such that recess 25 is integrally provided on guide means 15, as shown in particular in FIG. 7B.

Figure 7A:
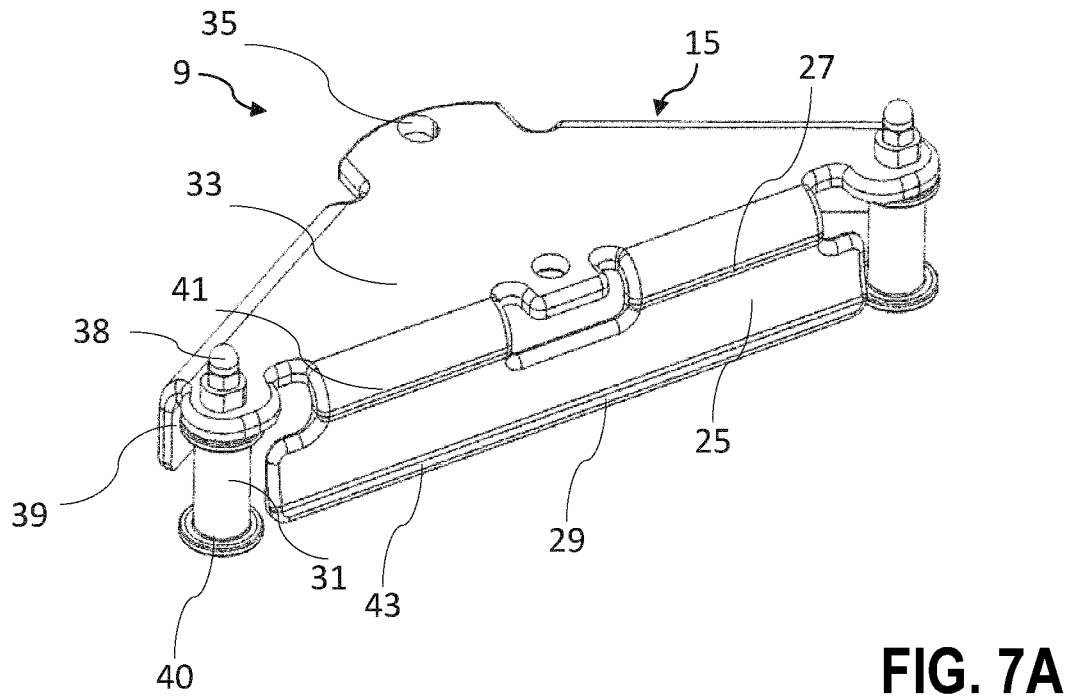
FIG. 7A shows a perspective view of a part of a conveyor unit according to the first embodiment of the invention.
Figure 7B:
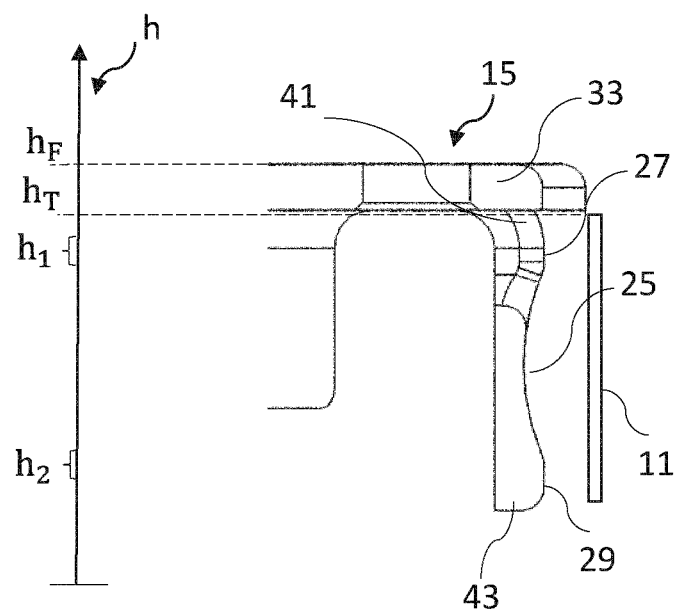
FIG. 7B shows a side view of the conveyor unit of FIG. 7A.

As FIG. 7B also shows, guide means 15 has a height $h_F$ and the conveyor belt has a height $h_T$ in direction h, with height $h_F$ exceeding height $h_T$.

Figure 8A:
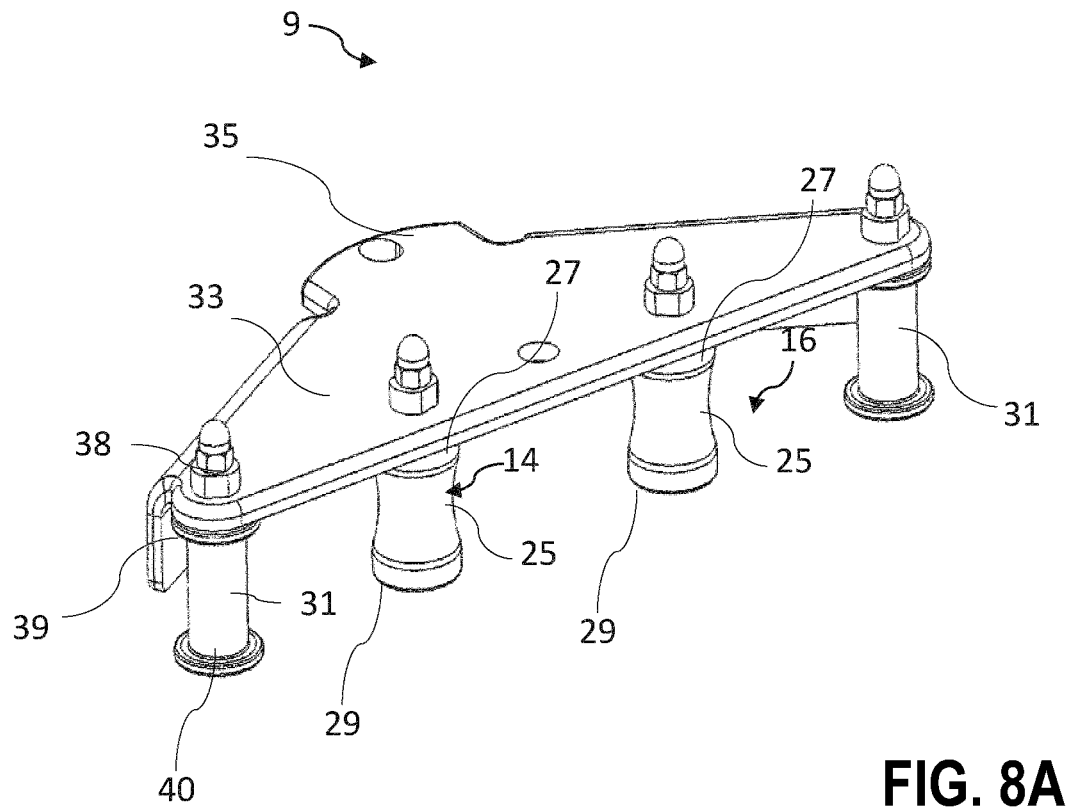
FIG. 8A shows a perspective view of a part of a conveyor unit according to the invention, according to the second embodiment of the invention.
Figure 8B:
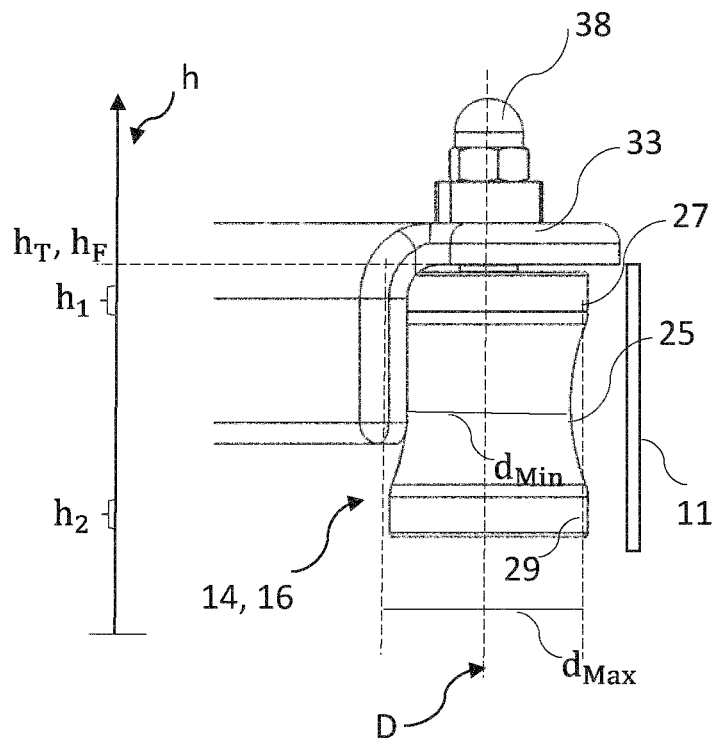
FIG. 8B shows a side view of the conveyor unit of FIG. 8A.

FIGS. 8A and 8B show a second preferred embodiment of the conveyor unit 9 according to the invention.

The conveyor unit 9 shown in FIGS. 8A and 8B differs from the first embodiment shown in FIGS. 7A and 7B by the formation of the guide means, which is embodied here as a number of guide rolls 14, 16.

The first guide roll 14 and the second guide roll 16 are each mounted on carrier plate 33 rotatably about a rotational axis extending in direction h.

Carrier plate 33 has through holes 35 which are designed for connecting elements 38 to pass through. By through holes 35 and the corresponding connecting elements 38, it is possible to couple not only one deflection roll 31, but also at least one guide roll 14, 16 with carrier plate 33. In this embodiment, deflection rolls 31 also have, in a known manner, an upper stop member 39 and a lower stop member 40.

For a better overview, the side view in FIG. 8B shows only a guide roll 14, 16, and the deflection roll 31 upstream from the guide roll is masked out in this view. Guide roll 14, 16 is mounted rotatably about a rotational axis D and has an upper support portion 27 for supporting conveyor belt 11 at a first height $h_1$ and a second support portion 29 for supporting conveyor belt 11 at a second height $h_2$. Guide rolls 14, 16 are designed as concave rolls, such that recess 25 is integrally embodied between the first support portion 27 and the second support portion 29 on the respective guide roll 14, 16.

Guide rolls 14, 16 each preferably have a varying diameter in direction h which obtains a maximum $d_{Max}$ in the region of the first support section 27 or at height $h_1$ and which obtains a second maximum $d_{Max}$ in the region of the second support section 29 or at height $h_2$. In the region of the receiving means, preferably in the middle between height $h_1$ and height $h_2$, guide rolls 14, 16 have a minimum diameter $d_{Min}$. Conveyor belt 11 can thus give way into the recess 25 provided by guide roll 14, 16, due to contact with a food product 3. Due to the fact that there is only rolling friction between guide rolls 14, 16 and conveyor belt 11, friction is minimized, and the conveying speed is affected only slightly by the conveyor belt 11 giving way into recess 25.

Figure 9:
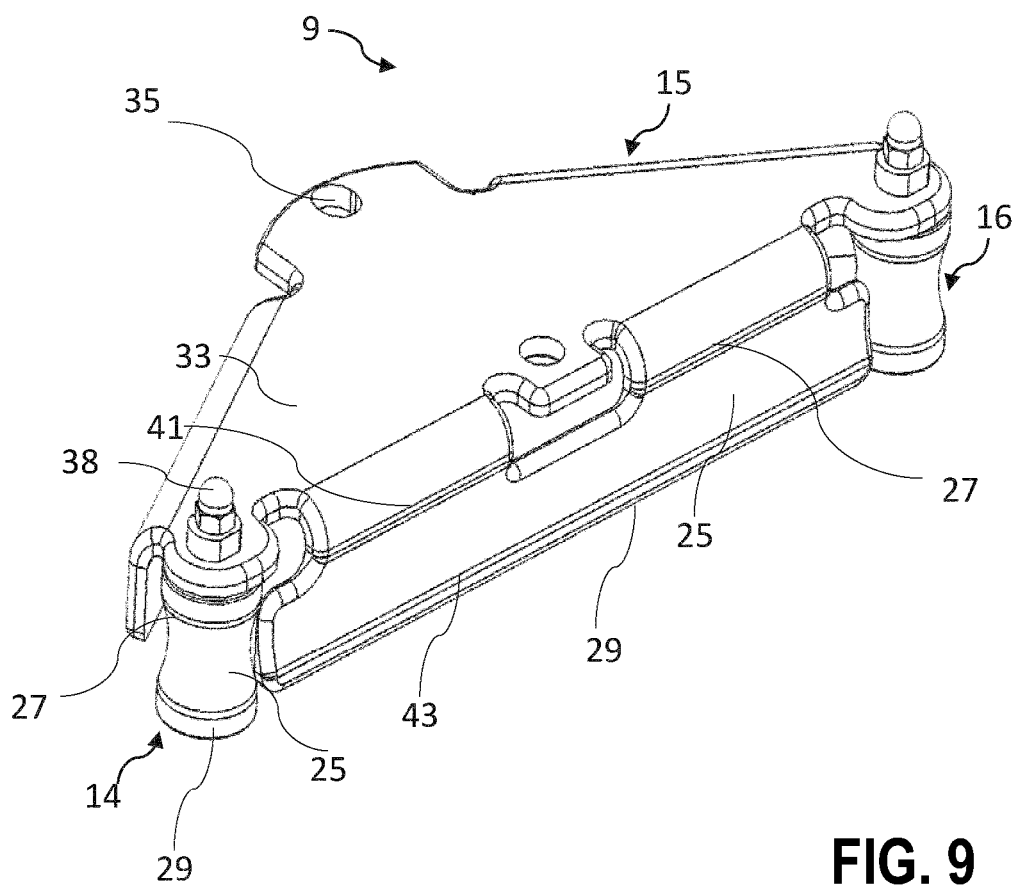
FIG. 9 shows a perspective view of a part of a conveyor unit according to a third embodiment of the invention.

FIG. 9 shows a third embodiment of conveyor unit 9 according to the invention. The embodiment shown in FIG. 9 differs from the embodiments shown in FIGS. 7A and 7B and in FIGS. 8A and 8B in that a first guide means 15 is designed as a guide plate and a second guide means is provided in the form of two guide rolls 14, 16, wherein guide plate 15 and guide rolls 14, 16 each have a first support portion 27 for supporting the food product at a first height $h_1$, a second support portion 29 for supporting the food product at a second height $h_2$ and a recess 25 arranged between the first support portion 27 and the second support portion 29.

Guide plate 15 is arranged between the two guide rolls 14, 16. In this preferred embodiment, conveyor belt 11 (cf. FIG. 6) can also be supported in such a way by guide rolls 14, 16 entering or exiting conveyor device 7 that it can give way into the recess 25 in guide rolls 14, 16 due to contact with too large or too curved a food product 3. Damage to food product 3 is thus prevented in this area also.

The shape and design of the guide means 15 embodied as a guide plate corresponds in all its features to the shape and design of the guide means according to the embodiments shown in FIGS. 7A and 7B.

The shape and design of guide rolls 14, 16 corresponds to the shape and design of the guide rolls 14, 16 in the embodiment shown in FIGS. 8A and 8B. By the two co-operating guide means 14, 15, 16, conveyor belt 11 is reliably supported over the entire contact area 13 (cf. FIG. 6), also and particularly in the region where the respective conveyor device 7 is entered or exited.

Within the meaning of the invention, the conveyor unit 9 shown in FIGS. 7A to 9 can be used not only together with a correspondingly designed second conveyor unit 10, conveyor units 9, 10 each being arranged in contact area 13 parallel to and spaced-apart from each other in pairs, such that food product 3 is received between them. The conveyor units 9 shown in FIGS. 7A to 9 can also be used in combination, so a first conveyor unit 9 may correspond, for example, to the first embodiment and a second conveyor unit 10, arranged parallel to and spaced apart from the first conveyor unit 9 in contact area 13, corresponds to the embodiments shown in FIGS. 8A and 8B.

The conveyor units 9 shown in FIGS. 7A to 9 can also be used, within the meaning of the invention, in combination with a receiving means that is not shown her in further detail. Such a receiving means can be provided, for example, by a guide rail or a guide plate which guides food products 3 relative to conveyor unit 9, the conveying movement in conveying direction T being produced solely by the friction between the conveyor belt 11 of conveyor units 9, and food product 3. Such a receiving means preferably has a low-friction surface coating.

The embodiments described above are only descriptions of preferred embodiments of the present invention, and are not intended to limit the scope of the present invention. Various variations and modifications can be made to the technical solution of the present invention by those of ordinary skills in the art, without departing from the design and spirit of the present invention. The variations and modifications should all fall within the scope defined by the claims of the present invention.

What is claimed is:

1. A cutting machine for separating food products, comprising:
    a cutting device for separating food products; and
    a conveyor device co-operating with the cutting device, for conveying the food products in a conveying direction,
    wherein the conveyor device includes at least one conveyor unit; comprising
    a conveyor belt extending in the conveying direction at least in sections in a contact area and designed to come into contact with the food products in the contact area,
    at least one deflection roll for guiding the conveyor belt,
    at least one guide means for guiding the conveyor belt in the contact area, wherein the at least one guide means has a first support portion for supporting the conveyor belt at a first height and a second support portion for supporting the conveyor belt at a second height,
    wherein the first height and the second height are spaced apart in a direction extending perpendicularly to the conveying direction, and the conveyor unit also includes at least one recess arranged between the first height and the second height, in which the conveyor belt can at least partly give way due to contact with a food product.

2. The cutting machine of claim 1, wherein the at least one guide means has the at least one recess which is arranged between the first support portion and the second support portion of the guide means, such that the conveyor belt can give way at least partly into the recess due to contact with a food product.

3. The cutting machine of claim 2, wherein the at least one guide means includes a first guide member having the first support portion and a second guide member having the second support portion, and the recess is arranged between the first guide member and the second guide member,
    wherein the conveyor unit is a first conveyor unit and the conveyor device has a second conveyor unit arranged in the contact area parallel to and spaced apart from the first conveyor unit,
    wherein at least one guide means is designed as a guide roll which is mounted rotatably about a rotational axis extending in direction,
    wherein the guide roll and/or the deflection roll have a diameter which varies in direction, and which obtains a maximum ($d_{Max}$) at the first support portion and/or at the second support portion,
    wherein the guide roll and/or the deflection roll is designed as a concave roll,
    wherein at least one guide means is designed as a guide plate having a first longitudinal edge extending in the conveying direction and a second longitudinal edge extending parallel to and spaced apart from the first longitudinal edge,
    wherein the first support portion is formed by the first longitudinal edge and/or the second support portion is formed by the second longitudinal edge,
    wherein the guide plate is arranged between two adjacent guide rolls, and
    wherein the conveyor belt has a height and the at least one guide means has a height in direction h that is greater than the height of the conveyor belt.

4. The cutting machine of claim 2, wherein the at least one guide means includes a first guide member having the first support portion and a second guide member having the second support portion, and the recess is arranged between the first guide member and the second guide member,
    wherein the conveyor device has a receiving means which co-operates with the conveyor unit and which is arranged in the contact area parallel to and spaced apart from the conveyor unit,
    wherein at least one guide means is designed as a guide roll which is mounted rotatably about a rotational axis extending in direction,
    wherein the guide roll and/or the deflection roll have a diameter which varies in direction, and which obtains a maximum ($d_{Max}$) at the first support portion and/or at the second support portion,
    wherein the guide roll and/or the deflection roll is designed as a concave roll,
    wherein at least one guide means is designed as a guide plate having a first longitudinal edge extending in the conveying direction and a second longitudinal edge extending parallel to and spaced apart from the first longitudinal edge,
    wherein the first support portion is formed by the first longitudinal edge and/or the second support portion is formed by the second longitudinal edge,
    wherein the guide plate is arranged between two adjacent guide rolls, and
    wherein the conveyor belt has a height and the at least one guide means has a height in direction h that is greater than the height of the conveyor belt.

5. The cutting machine of claim 1, wherein the at least one guide means includes a first guide member having the first support portion and a second guide member having the second support portion, and the recess is arranged between the first guide member and the second guide member.

6. The cutting machine of claim 1, wherein the conveyor unit is a first conveyor unit and the conveyor device has a second conveyor unit arranged in the contact area parallel to and spaced apart from the first conveyor unit.

7. A cutting machine of claim 1, wherein the conveyor device has a receiving means which co-operates with the conveyor unit and which is arranged in the contact area parallel to and spaced apart from the conveyor unit.

8. The cutting machine of claim 1, wherein at least one guide means is designed as a guide roll which is mounted rotatably about a rotational axis extending in direction.

9. The cutting machine of claim 8, wherein the guide roll and/or the deflection roll have a diameter which varies in direction, and which obtains a maximum ($d_{Max}$) at the first support portion and/or at the second support portion.

10. The cutting machine of claim 8, wherein the guide roll and/or the deflection roll is designed as a concave roll.

11. The cutting machine of claim 1, wherein at least one guide means is designed as a guide plate having a first longitudinal edge extending in the conveying direction and a second longitudinal edge extending parallel to and spaced apart from the first longitudinal edge, and wherein the first support portion is formed by the first longitudinal edge and/or the second support portion is formed by the second longitudinal edge.

12. The cutting machine of claim 11, wherein the guide plate is arranged between two adjacent guide rolls.

13. The cutting machine of claim 1, wherein the conveyor belt has a height and the at least one guide means has a height in direction h that is greater than the height of the conveyor belt.

14. A food processing machine for producing a food product, comprising:
 a stuffing machine for receiving a pasty food mass and for stuffing the pasty food mass into a casing,
 a portioning device for portioning the food in the casing, and
 the cutting machine of claim 1.

15. A conveyor device for a cutting machine, comprising:
 a conveyor belt extending in a conveying direction at least in sections in a contact area and designed to come into contact with food products in the contact area,
 at least one deflection roll for guiding the conveyor belt,
 at least one guide means for guiding the conveyor belt in the contact area,
 wherein the at least one guide means has a first support portion for supporting the conveyor belt at a first height and a second support portion for supporting the conveyor belt at a second height, and
 wherein said first height and said second height are spaced apart in a direction extending perpendicularly to the conveying direction, and the conveyor unit also has at least one recess arranged between the first height and the second height, in which the conveyor belt an at least partly give way due to contact with a food product.

16. The conveyor device of claim 15, wherein the conveyor device is configured for use with the cutting machine of claim 1.

* * * * *